United States Patent
Taguchi (10) Patent No.: US 9,884,357 B2
(45) Date of Patent: Feb. 6, 2018

(54) METAL SEPARATOR MOLDING DEVICE AND METHOD FOR MOLDING METAL SEPARATOR

(71) Applicant: Nissan Motor Co., Ltd., Yokohama-shi, Kanagawa (JP)

(72) Inventor: Naoto Taguchi, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 74 days.

(21) Appl. No.: 14/787,492

(22) PCT Filed: Apr. 3, 2014

(86) PCT No.: PCT/JP2014/059898
§ 371 (c)(1),
(2) Date: Oct. 28, 2015

(87) PCT Pub. No.: WO2014/188800
PCT Pub. Date: Nov. 27, 2014

(65) Prior Publication Data
US 2016/0074919 A1    Mar. 17, 2016

(30) Foreign Application Priority Data
May 22, 2013    (JP) ................. 2013-108064

(51) Int. Cl.
*B21D 13/02*    (2006.01)
*B21D 22/02*    (2006.01)
*B21D 37/16*    (2006.01)
*H01M 8/0206*    (2016.01)
(Continued)

(52) U.S. Cl.
CPC ............. *B21D 22/02* (2013.01); *B21D 13/02* (2013.01); *B21D 37/16* (2013.01); *H01M 8/0206* (2013.01); *H01M 8/0254* (2013.01); *H01M 8/0258* (2013.01)

(58) Field of Classification Search
CPC ...... B21D 13/02; B21D 22/02; B21D 22/022; B21D 37/16; B21D 24/005; B21D 24/16
See application file for complete search history.

(56) References Cited

U.S. PATENT DOCUMENTS 4,450,707 A    5/1984    Ricard et al.
5,256,218 A    10/1993    Bakalyar et al.

FOREIGN PATENT DOCUMENTS

| CN | 1826361 A | 8/2006 |
|---|---|---|
| CN | 1856892 A | 11/2006 |
| DE | 10 2005 032 113 B3 | 2/2007 |

(Continued)

*Primary Examiner* — Debra Sullivan
(74) *Attorney, Agent, or Firm* — Global IP Counselors, LLP (57) ABSTRACT

A metal separator molding device is provided for molding a metal separator by press-molding a thin plate-shaped base material by using a first die and a second die capable of moving towards and away from each other. The metal separator molding device has a first heating part for heating the thin plate-shaped base material, a channel-processing part for pressing the thin plate-shaped base material heated by the first heating part using the first die and the second die to form channels through which a medium flows, and a controller for controlling the operations of the first heating part and the channel-processing part.

13 Claims, 10 Drawing Sheets

(51) Int. Cl.
*H01M 8/0258* (2016.01)
*H01M 8/0254* (2016.01)

(56) References Cited

FOREIGN PATENT DOCUMENTS

| | | |
|---|---|---|
| DE | 10 2010 027 554 A1 | 1/2012 |
| GB | 2 077 634 A | 12/1981 |
| JP | 2000-285934 A | 10/2000 |
| JP | 2004-134090 A | 4/2004 |
| JP | 2004-255648 A | 9/2004 |
| JP | 2005-88075 A | 4/2005 |
| JP | 2005-93391 A | 4/2005 |
| JP | 2006-310020 A | 11/2006 |
| JP | 2008-4291 A | 1/2008 |
| JP | 2008-36699 A | 2/2008 |
| JP | 2008068282 A * | 3/2008 |
| JP | 2008-84843 A | 4/2008 |
| JP | 2011-255413 A | 12/2011 |

\* cited by examiner

METAL SEPARATOR MOLDING DEVICE AND METHOD FOR MOLDING METAL SEPARATOR

CROSS-REFERENCE TO RELATED APPLICATIONS

This application is a U.S. National stage application of International Application No. PCT/JP2014/059898, filed Apr. 3, 2014, which claims priority to Japanese Patent Application No. 2013-108064 filed in Japan on May 22, 2013.

BACKGROUND

Field of the Invention

The present invention relates to a device and method for molding a metal separator.

Background Information

A metal separator for a fuel battery is press molded using a press machine and a die (for example, see Japanese Laid-Open Patent Application No. 2008-84843 Channels through which a fuel gas, an oxidation gas, and cooling water (a coolant) all flow are formed by overlaying two metal separators.

SUMMARY

A metal separator for a fuel battery is commonly susceptible to wrinkling or other distortion because the separator is comparatively thin and is formed by press-molding a long strip of base material. Sufficient positional accuracy cannot be achieved with metal separators that have residual distortion, and such separators are difficult to position when layered over a membrane electrode assembly. Furthermore, because distortions remain in the thickness direction of the base material of the metal separator, the distortions lead to deformation of a cell module after the metal separator and the membrane electrode assembly are stacked to assemble the cell module. Therefore, how to remove distortions is an important problem in the molding of metal separators.

The present invention was devised in order to resolve the above-described problems encountered with conventional technology, it being an object of the invention to provide a device and method for molding a metal separator whereby distortions created during press molding are removed and the metal separator can be molded without any residual distortion.

The device for molding a metal separator according to the present invention, which achieves the purpose described above, press-molds a thin plate-shaped base material using a first die and a second die capable of moving towards and away from each other, and has a heating part, a processing part, and a controller. The heating part heats the thin plate-shaped base material. The processing part causes the thin plate-shaped base material heated by the heating part to be pressed by the first die and the second die to form channels through which a medium flows. The controller controls the operations of the heating part and the processing part.

The method for molding a metal separator according to the present invention, which achieves the purpose described above, press-molds a thin plate-shaped base material using a first die and a second die provided so as to be capable of moving towards and away from each other, and has a heating step and a processing step. In the heating step, the thin plate-shaped base material is heated. In the processing step, the heated thin plate-shaped base material is pressed using the first die and the second die to form channels through which a medium flows.

BRIEF DESCRIPTION OF THE DRAWINGS

Referring now to the attached drawings which form a part of this original disclosure.

DETAILED DESCRIPTION OF THE EMBODIMENTS

An embodiment according to the present invention is described below with reference to the accompanying drawings. There are cases in which the sizes and ratios of the components in the drawings are exaggerated for convenience in the description and are different from the actual sizes and ratios.

A device 100 for molding a metal separator 91 according to the present embodiment is described with reference to FIGS. 1 to 11.

First, the configuration of the device 100 for molding the metal separator 91 is described with reference to FIGS. 1 to 5.

Figure 1:
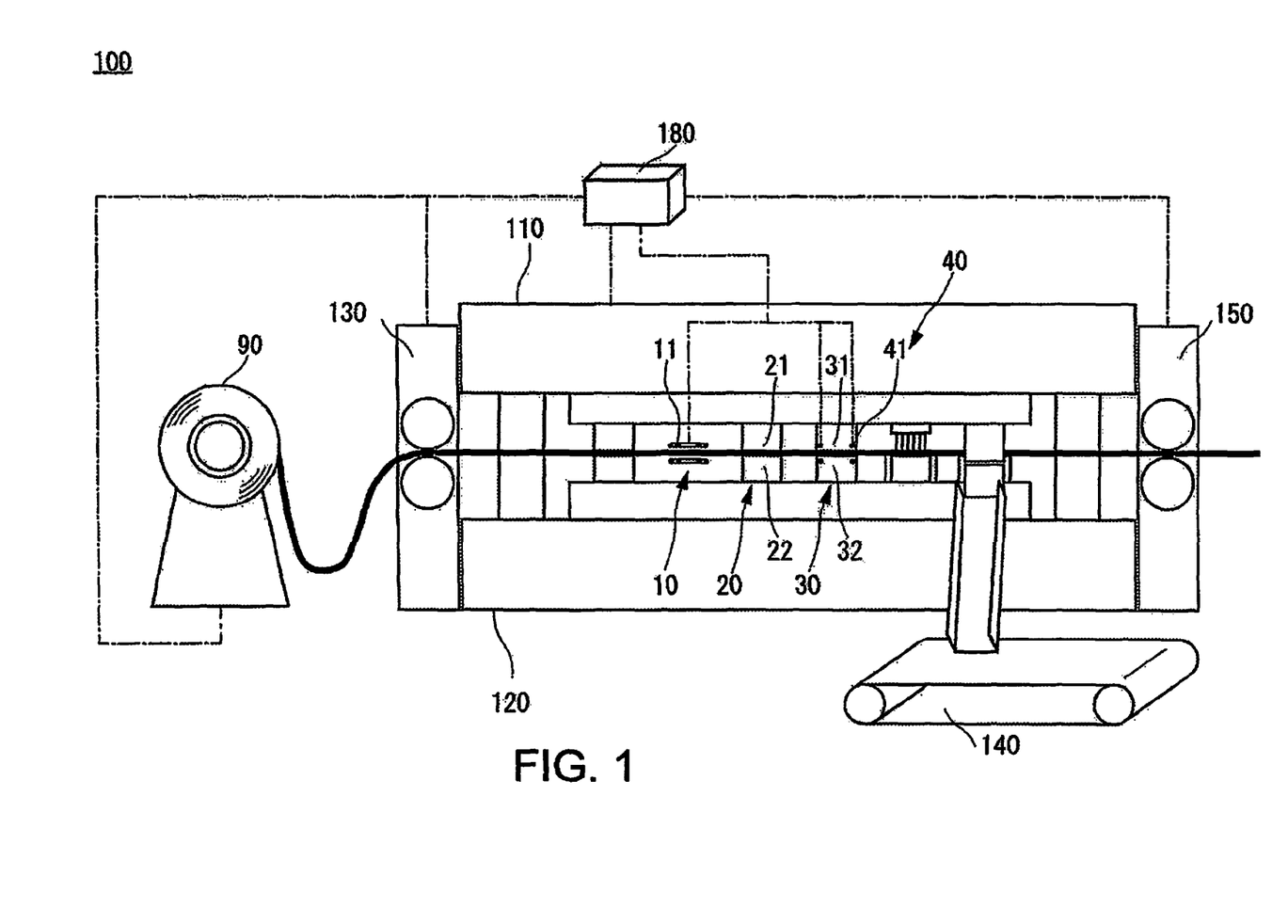
FIG. 1 is a schematic diagram showing a device for molding a metal separator according to an embodiment of the present invention.
Figure 2:
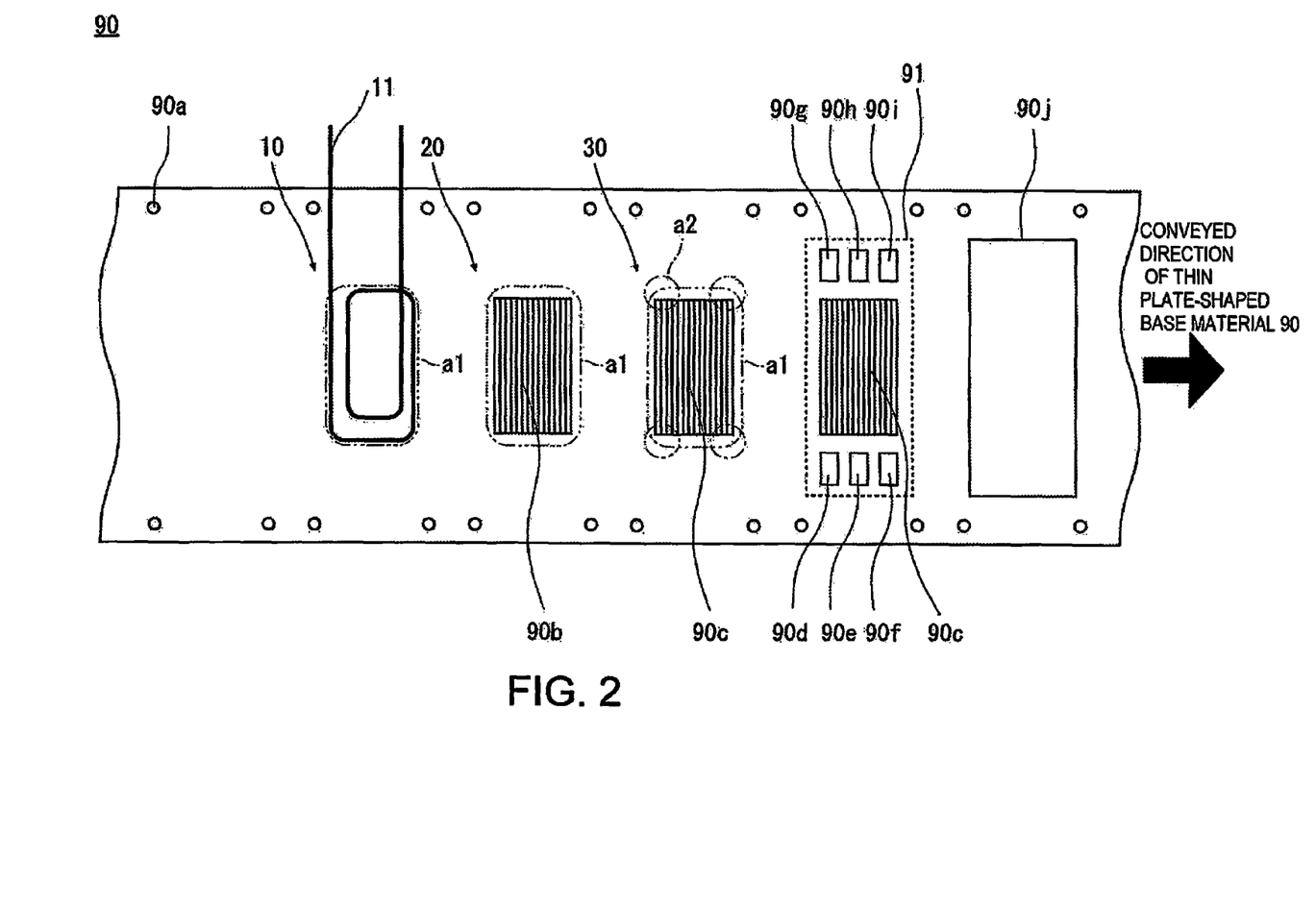
FIG. 2 is a schematic diagram showing a thin plate-shaped base material subjected to various molding processes using the molding device according to the embodiment.
Figure 3:
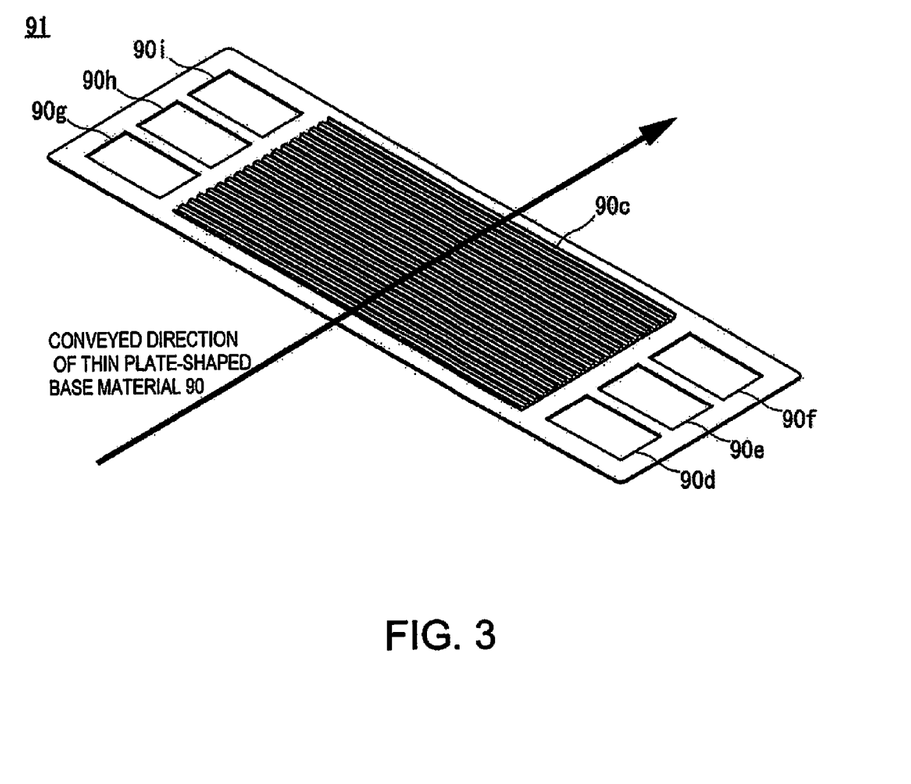
FIG. 3 is a perspective view showing a metal separator molded by the molding device according to the embodiment.
Figure 4:
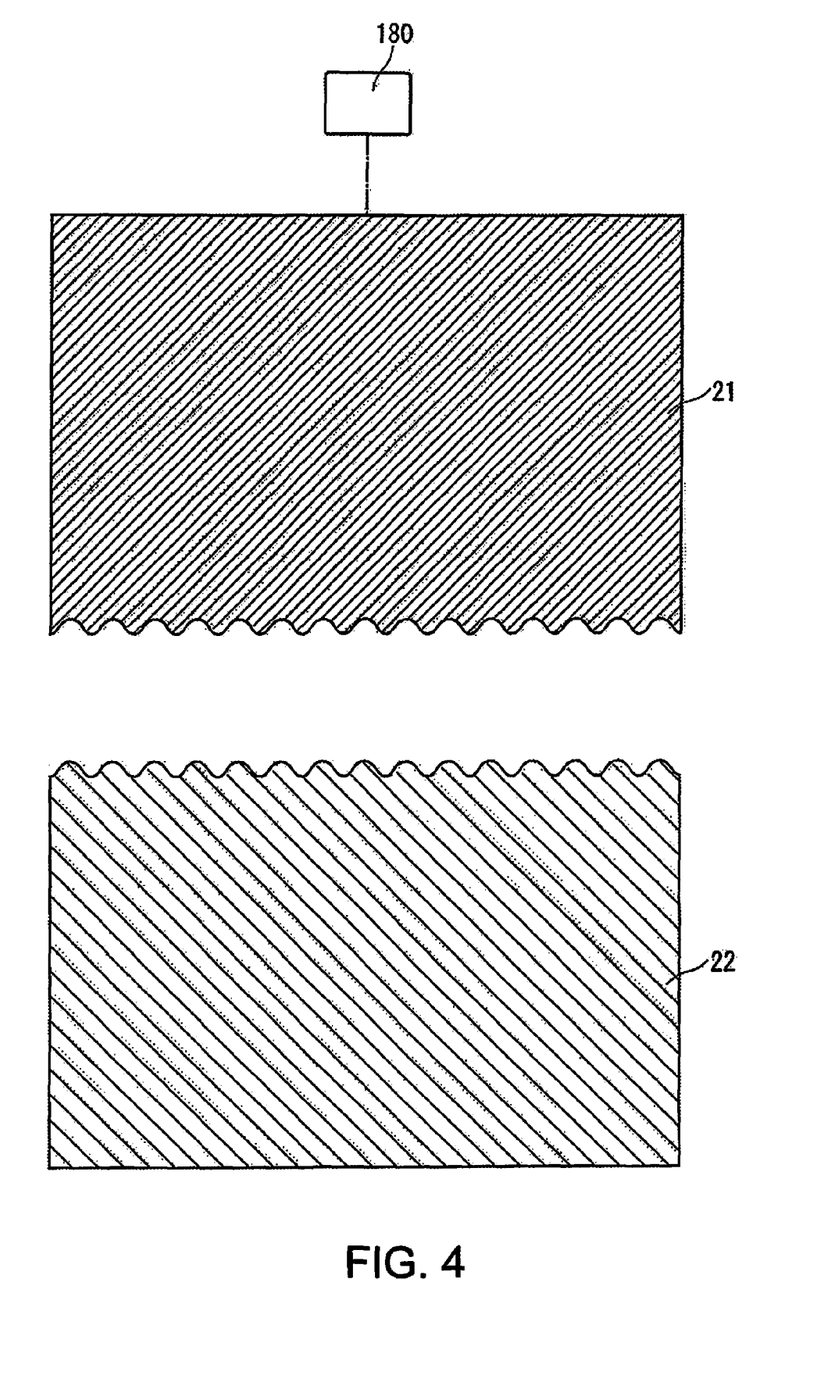
FIG. 4 is an end surface view showing the configuration of a preparatory processing part of the molding device according to the embodiment.
Figure 5:
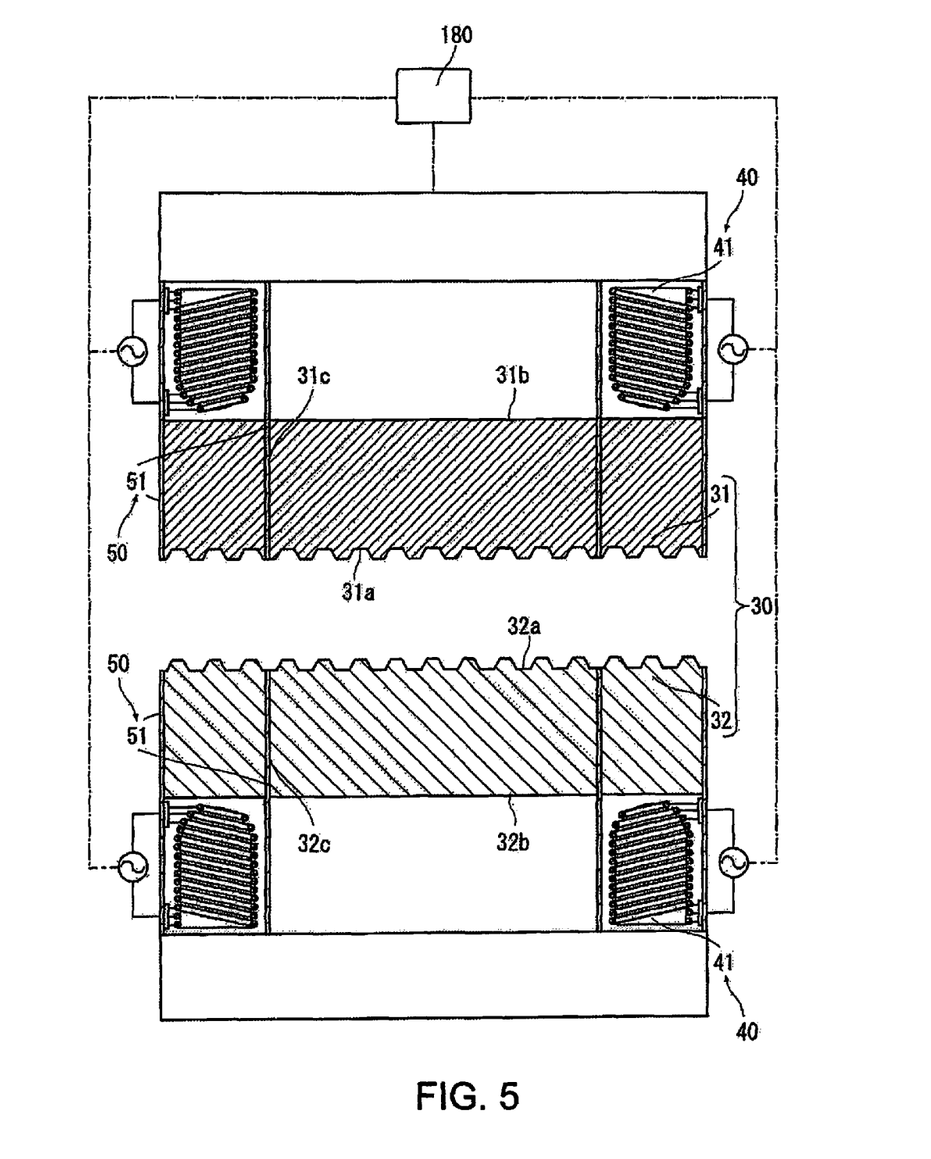
FIG. 5 is an end surface view showing the configuration of a channel processing part, a second heating part, and an insulating part of the molding device according to the embodiment.

FIG. 1 is a schematic diagram showing the device 100 for molding the metal separator 91. FIG. 2 is a schematic diagram showing a thin plate-shaped base material 90 subjected to various molding processes using the molding device 100. FIG. 3 is a perspective view showing a metal separator 91 molded by the molding device 100. FIG. 4 is an end surface view showing the configuration of a preparatory processing part 20 of the molding device 100. FIG. 5 is an end surface view showing the configuration of a channel processing part 30, a second heating part 40, and insulating parts 50 of the molding device 100.

The molding device 100 forms openings, irregularities, and the like in the area of a long strip of the thin plate-shaped base material 90 that will become the metal separator 91 shown in FIG. 3. The openings are equivalent to, e.g., locating holes 90a and manifold holes 90d to 90i described hereinafter. The irregularities are equivalent to channels 90c and irregularities of a preparatory molded article 90b, described hereinafter. The molding device 100 includes an upper die 110, a lower die 120, an incoming feeder 130, an outgoing conveyor 140, an outgoing feeder 150, and a controller 180.

The upper die 110 and the lower die 120 have multiple types of press dies for molding the openings, irregularities, and the like in the thin plate-shaped base material 90. The multiple types of press dies are arranged along the conveying direction of the thin plate-shaped base material 90. The locating holes 90a for positioning, the irregular-shaped preparatory molded article 90b, the channels 90c for channeling a medium, and the manifold holes 90d to 90i for supplying and discharging the medium are molded into the thin plate-shaped base material 90 by the multiple types of press dies, as shown in FIG. 2. The outer edge portion of the metal separator 91 is then punched to open up punch holes 90j. The manifold holes 90d to 90i are an anode gas supply port 90d, a cooling fluid supply port 90e, a cathode gas supply port 90f, a cathode gas discharge port 90g, a cooling fluid discharge port 90h, and an anode gas discharge port 90i, as shown in FIG. 3. The anode gas is a fuel gas (hydrogen), and the cathode gas is an oxidation gas (air).

The incoming feeder 130 conveys the pre-processed thin plate-shaped base material 90 in between the upper die 110 and the lower die 120. The incoming feeder 130 is provided on the upstream side of the upper die 110 and the lower die 120. The outgoing conveyor 140 conveys the punched out metal separator 91 out from the thin plate-shaped base material 90. The outgoing feeder 150 conveys the discarded thin plate-shaped base material 90 out from between the upper die 110 and the lower die 120 after the metal separator 91 has been punched out. The outgoing feeder 150 is provided on the downstream side of the upper die 110 and the lower die 120. The controller 180 controls the speed and timing at which the thin plate-shaped base material 90 is conveyed in by the incoming feeder 130, as well as the speed and timing at which the thin plate-shaped base material 90 is conveyed out by the outgoing feeder 150. The controller 180 controls the movable upper die 110 so that after the upper die 110 is urged against the stationary lower die 120, the upper die 110 is separated from the lower die 120.

Next, the characteristic configuration of the device 100 for molding the metal separator 91 is described with reference to FIGS. 1, 2, 4, and 5.

The molding device 100 performs heating and processing on the thin plate-shaped base material 90, and forms the channels 90c on the thin plate-shaped base material 90. The molding device 100 press-molds the thin plate-shaped base material 90 using a channel-processing upper die 31 (equivalent to the first die) and a channel-processing lower die 32 (equivalent to the second die) which are capable of moving toward and away from each other. The molding device 100 has a first heating part 10 (equivalent to the heating part) and a channel-processing part 30 (equivalent to the processing part). The first heating part 10 heats the thin plate-shaped base material 90. The channel-processing part 30 presses the heated thin plate-shaped base material 90 using the channel-processing upper die 31 and the channel-processing lower die 32 to form the channels 90c for channeling the medium. The controller 180 controls the operations of the first heating part 10 and the channel-processing part 30.

The first heating part 10 is provided in order to sufficiently heat the thin plate-shaped base material 90 before the thin plate-shaped base material 90 is press-molded by the channel-processing part 30 to form the channels 90c. The first heating part 10 has first heating members 11 for heating the thin plate-shaped base material 90, as shown in FIGS. 1 and 2. The first heating members 11 are configured from something capable of heating the thin plate-shaped base material 90 instantly and uniformly, such as, e.g., high-frequency coils, far-infrared heaters, steam heaters, hot air blowers, or the like.

The first heating members 11 are provided both between the upper die 110 and the thin plate-shaped base material 90, and between the lower die 120 and the thin plate-shaped base material 90, in order to heat the upper and lower surfaces of the thin plate-shaped base material 90 as shown in FIG. 1. A control performed by the controller 180 causes the first heating part 10 to begin to heat the thin plate-shaped base material 90 as the thin plate-shaped base material 90 begins to be conveyed by the molding device 100. The first heating part 10 heats the area (first area a1) where the channels 90c are formed in the thin plate-shaped base material 90 conveyed by the molding device 100. The heating by the first heating part 10 sufficiently softens the first area a1 of the thin plate-shaped base material 90.

The molding device 100 also has a preparatory processing part 20 for pre-molding the first area a1 of the thin plate-shaped base material 90 to form the preparatory molded article 90b, before the heat-softened thin plate-shaped base material 90 is press-molded by the channel-processing part 30 to form the channels 90c. The preparatory molding by the preparatory processing part 20 is performed after the heat treatment by the first heating part 10.

Before the channels 90c are molded into the thin plate-shaped base material 90, the preparatory processing part 20 performs preparatory molding, which gives a preparatory shape to the thin plate-shaped base material 90, to form the preparatory molded article 90b and then mold the channels 90c. The preparatory processing part 20 has a preparatory processing upper die 21 that operates in coordination with the upper die 110, and a preparatory processing lower die 22 fixed in place in the same manner as the lower die 120, as shown in FIG. 4. Using the preparatory processing upper die 21 and the preparatory processing lower die 22, the preparatory processing part 20 presses the thin plate-shaped base material 90, softened by the heating of the first heating part 10, to form the preparatory molded article 90b. The aforementioned preparatory shape of the thin plate-shaped base material 90 is, e.g., a concave open shape where the channels 90c are easily processed by the channel-processing part 30. After the softened thin plate-shaped base material 90 is pressed in the preparatory processing part 20 to form the preparatory molded article 90b, the preparatory molded article 90b is pressed in the channel-processing part 30 to form the channels 90c. Thus, because the thin plate-shaped base material 90 is incrementally bent by forming the preparatory molded article 90b in the preparatory processing part 20, channels 90c free of wrinkles and other distortions can be formed.

The channel-processing part 30 is provided in order to press the softened preparatory molded article 90b formed by the preparatory processing part 20 to mold the channels 90c. The channel-processing part 30 has the channel-processing upper die 31, which operates in coordination with the upper die 110, and the channel-processing lower die 32, which is fixed in place similar to the lower die 120, as shown in FIG. 5. When the preparatory molded article 90b softened by the channel-processing upper die 31 and the channel-processing lower die 32 is pressed to begin forming the channels 90c, there are virtually no wrinkles or other distortions in the channels 90c formed. Because the preparatory molded article 90b is pressed while the channel-processing part 30 is soft, wrinkles and other distortions are pushed out to the outer periphery of the first area a1 where the channels 90c formed by pressing the channel-processing part 30 are formed, and wrinkles and other distortions are not likely to remain in the middle of the first area a1.

In the molding device 100, the thin plate-shaped base material 90 is heated by the first heating part 10 as described above, and in the channel-processing part 30, the heated thin plate-shaped base material 90 is pressed by the channel-processing upper die 31 and the channel-processing lower die 32. Because the thin plate-shaped base material 90 is thus pressed by the channel-processing upper die 31 and the channel-processing lower die 32 after having been heated and softened, wrinkles and other distortions created during press molding can be removed in the surface direction and the metal separator 91 can be molded without any residual distortions.

Due to having the configuration described above, the molding device 100 can mold the metal separator 91 without any residual wrinkles or other distortions created during press molding, but the molding device 100 also has the configuration described below in order to more reliably remove distortions. The further configuration of the molding device 100 is described below with reference to FIG. 5.

The molding device 100 also has a second heating part 40 (equivalent to the other heating part) for heating parts of the outer periphery of the area (the first area a1) of the thin plate-shaped base material 90 where the channels 90c are formed, when the channels 90c are formed by the channel-processing upper die 31 and the channel-processing lower die 32.

The second heating part 40 is provided in order to remove wrinkles and other distortions pushed out to the outer periphery of the first area a1 in the thin plate-shaped base material 90 where the channels 90c are formed, when the channel-processing part 30 has pushed the softened thin plate-shaped base material 90 to form the channels 90c. The second heating part 40 has a plurality of second heating members 41 for heating the channel-processing upper die 31 on the side of an upper surface 31b, which is the side of the channel-processing upper die 31 opposite a pressing surface 31a that presses the thin plate-shaped base material 90. The second heating part 40 also has a plurality of second heating members 41 for heating the channel-processing lower die 32 on the side of a lower surface 32b, which is the side of the channel-processing lower die 32 opposite a pressing surface 32a that presses the thin plate-shaped base material 90. The second heating members 41 are provided to parts of the outer peripheries of the upper surface 31b of the channel-processing upper die 31 and the lower surface 32b of the channel-processing lower die 32. The second heating members 41 are directly attached to the channel-processing upper die 31 and the channel-processing lower die 32. The second heating members 41 are configured from something capable of heating parts of the outer periphery of the thin plate-shaped base material 90 instantly and uniformly, such as, e.g., high-frequency coils, far-infrared heaters, steam heaters, hot air blowers, or the like.

When a predetermined time duration has elapsed after the thin plate-shaped base material 90 is pressed by the channel-processing upper die 31 and the channel-processing lower die 32 to begin molding the channels 90c, the second heating members 41 are controlled by the controller 180 to begin heating. The second heating members 41 heat parts of the outer periphery (the second areas a2) of the first area a1 of the thin plate-shaped base material 90 pressed by the channel-processing part 30 to form the channels 90c. Wrinkles and other distortions pushed out to the outer periphery of the first area a1 of the thin plate-shaped base material 90 by the pressure are pushed farther out to the ends of the outer periphery of the second areas a2, because the second areas a2 are particularly softened by the second heating part 40 heating the second areas a2 of the thin plate-shaped base material 90. Thus, while the thin plate-shaped base material 90 is being pressed by the channel-processing part 30 to form the channels 90c, the second areas a2, which are parts of the outer periphery of the first area a1 of the thin plate-shaped base material 90, are heated by the second heating part 40, whereby wrinkles and other distortions in the channels 90c can be reliably removed. Through the control of the controller 180, the supply of electric power to the second heating members 41 is cut off at the same time that the molding of the channels 90c is complete and the channel-processing upper die 31 separates from the channel-processing lower die 32, and heating is stopped.

The second heating part 40 heats the four corners of the rectangular-shaped area.

In the outer periphery of the first area a1 where the channel-processing part 30 presses the thin plate-shaped base material 90 to form the channels 90c, wrinkles and other distortions are likely to remain towards the four corners farthest from the middle of the first area a1. Therefore the second heating part 40 is provided in order to remove wrinkles and other distortions pushed out towards the four corners in the outer periphery of the first area a1 of the thin plate-shaped base material 90 where the channels 90c are formed. The second heating members 41 are provided to the four corners of both the upper surface 31b of the channel-processing upper die 31 and the lower surface 32b of the channel-processing lower die 32, as shown in FIG. 5. Wrinkles and other distortions pushed out towards the four corners of the channels 90c by the pressure of the channel-processing part 30 are pushed further out towards the ends of the second areas a2, because the second areas a2 are particularly softened by the second heating part 40 heating the four corners (the second areas a2) of the channels 90c. Thus, while the thin plate-shaped base material 90 is pressed by the channel-processing part 30 to form the channels 90c, the second areas a2, which are the four corners of the first area a1 of the thin plate-shaped base material 90, are heated by the second heating part 40, whereby wrinkles and other distortions in the channels 90c can be more reliably removed.

The molding device 100 also has insulating parts 50 which are provided to the channel-processing part 30, and which insulate and separate the second areas (equivalent to areas of part of the outer periphery) a2 and other areas in the first area a1 of the thin plate-shaped base material 90 where the channels 90c are formed.

The insulating parts 50 are provided so that the second heating part 40 heats only part of the outer periphery of the first area a1 where the channels 90c are formed. The insulating parts 50 are provided to both the channel-processing upper die 31 and the channel-processing lower die 32, as shown in FIG. 5. When the channel-processing upper die 31 and the channel-processing lower die 32 form the channels 90c in the thin plate-shaped base material 90, the insulating parts 50 separate the second areas a2 and the other areas in the first area a1 of the thin plate-shaped base material 90, and prevent heat from being transferred between these areas. The insulating parts 50 have insulating members 51 in part of the outer periphery of the four corners of the channel-processing upper die 31 and the channel-processing lower die 32.

The insulating members 51 are configured from heat-insulating, very hard members, e.g. from a ceramic (including glass). The insulating members 51 are shaped to enclose the second heating members 41 as shown in FIG. 5 and other drawings, and are configured from cylindrical shapes when the second heating members 41 are, e.g., coil-shaped heating members. The insulating members 51 are installed in grooves 31c processed into the channel-processing upper die 31 and grooves 32c processed into the channel-processing lower die 32, as shown in FIG. 4.

First, the first heating part 10 heats the first area a1 of the range in the thin plate-shaped base material 90 where the channels 90c are formed (the first heating), as shown in FIG. 2. The softened thin plate-shaped base material 90 is then press-molded in the preparatory processing part 20 and the channel processing part 30 to form the channels 90c. When the channel processing part 30 presses the thin plate-shaped base material 90 to form the channels 90c, the second areas a2, which are parts of the outer periphery or the four corners of the first area a1, are heated by the second heating part 40 (the second heating). Providing the insulating parts 50 makes it possible to ensure that the respective second heating members 41 of the second heating part 40 heat only the second areas a2 of the thin plate-shaped base material 90. Therefore, heat transfer between the second areas a2 and other areas in the first area a1 of the thin plate-shaped base material 90 can be blocked by providing the insulating parts 50. Two-stage heating with a time lag can thereby be performed on the thin plate-shaped base material 90 by the first heating part 10 and the second heating part 40.

When the controller 180 forms the channels 90c using the channel-processing upper die 31 and the channel-processing lower die 32, the controller heats parts of the outer periphery of the channels 90c using the second heating part 40.

The controller 180 controls the heating operations of the first heating part 10 and the second heating part 40. The controller 180 includes a ROM, CPU, and RAM. The ROM (read only memory) stores control programs for controlling the heating operations of the first heating part 10 and the second heating part 40.

The channel-processing upper die 31 and the channel-processing lower die 32 preferably have mutually different die temperatures when the channels 90c are being formed.

In order to control the die temperatures of both the channel-processing upper die 31 and the channel-processing lower die 32, the controller 180 controls the heating temperatures of the second heating members 41 installed on the channel-processing upper die 31 side and the second heating members 41 installed on the channel-processing lower die 32 side. The controller 180 controls the die temperatures so that the die temperature of the channel-processing lower die 32 is lower than the die temperature of the channel-processing upper die 31. Due to this heating control, when the channel-processing upper die 31 and the channel-processing lower die 32 are separated, the thin plate-shaped base material 90 in which the channels 90c are formed sticks to the channel-processing lower die 32 side due to shrinkage deformation. Because the thin plate-shaped base material 90 in which the channels 90c are formed sticks to the channel-processing lower die 32 side, the base material can be easily conveyed without creating wrinkles or other distortions to the next processing part that forms the manifold holes 90d to 90i as shown in FIG. 2.

Next, the method of molding the metal separator 91 (see FIG. 2) is described with reference to FIG. 6.

Figure 6:
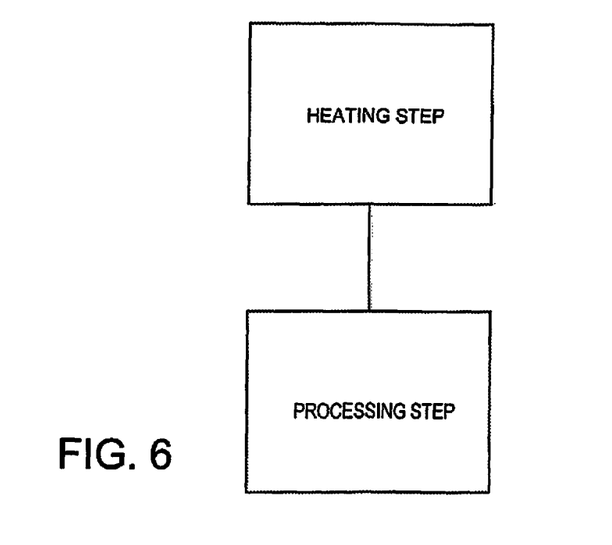
FIG. 6 is a flowchart showing the method of molding the metal separator according to the embodiment.

FIG. 6 is a flowchart showing the method of molding the metal separator 91.

In the method of molding the metal separator 91, the thin plate-shaped base material 90 (see FIG. 2) is press-molded by the channel-processing upper die 31 (equivalent to the first die, see FIG. 5) and the channel-processing lower die 32 (equivalent to the second die, see FIG. 5), which are provided so as to be capable of moving toward and away from each other. The molding method has a heating step and a processing step, as shown in FIG. 6. In the heating step, the thin plate-shaped base material 90 is heated. In the processing step, the heated thin plate-shaped base material 90 is pressed by the channel-processing upper die 31 and the channel-processing lower die 32 to form the channels 90c (see FIG. 2) through which a medium is channeled. The molding device 100 described above is a molding device that embodies the method of molding the metal separator 91.

Next, the operations of the molding device 100 will be described with reference to FIGS. 8 to 11 in addition to the flowchart of FIG. 7.

Figure 7:
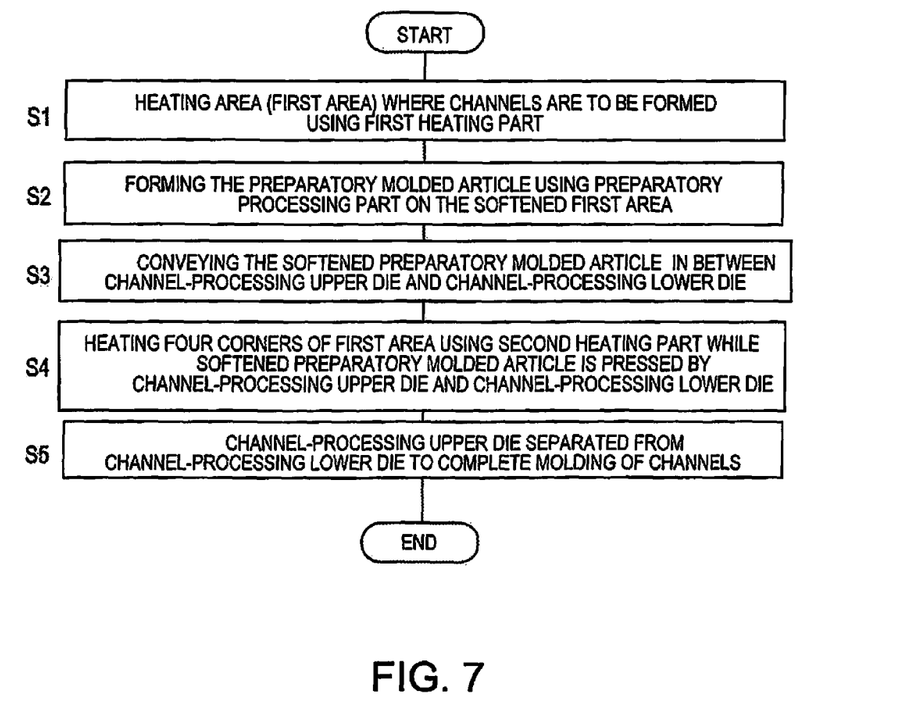
FIG. 7 is a flowchart showing the operations of the molding device according to the embodiment.
Figure 8:
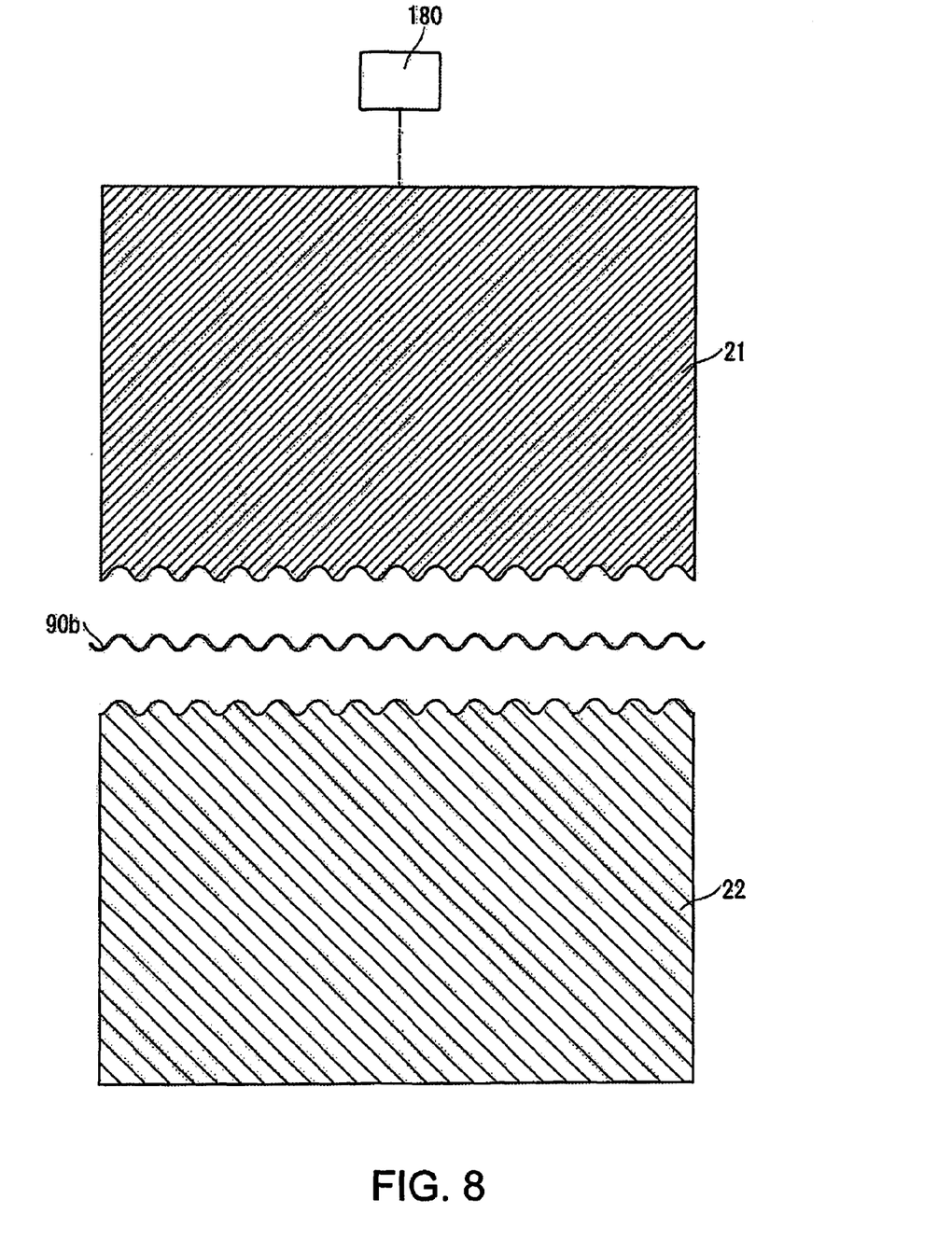
FIG. 8 is an end surface view showing the state in which the thin plate-shaped base material is conveyed out from the preparatory processing part of the molding device according to the embodiment after the preparatory molded article has finished being molded.
Figure 9:
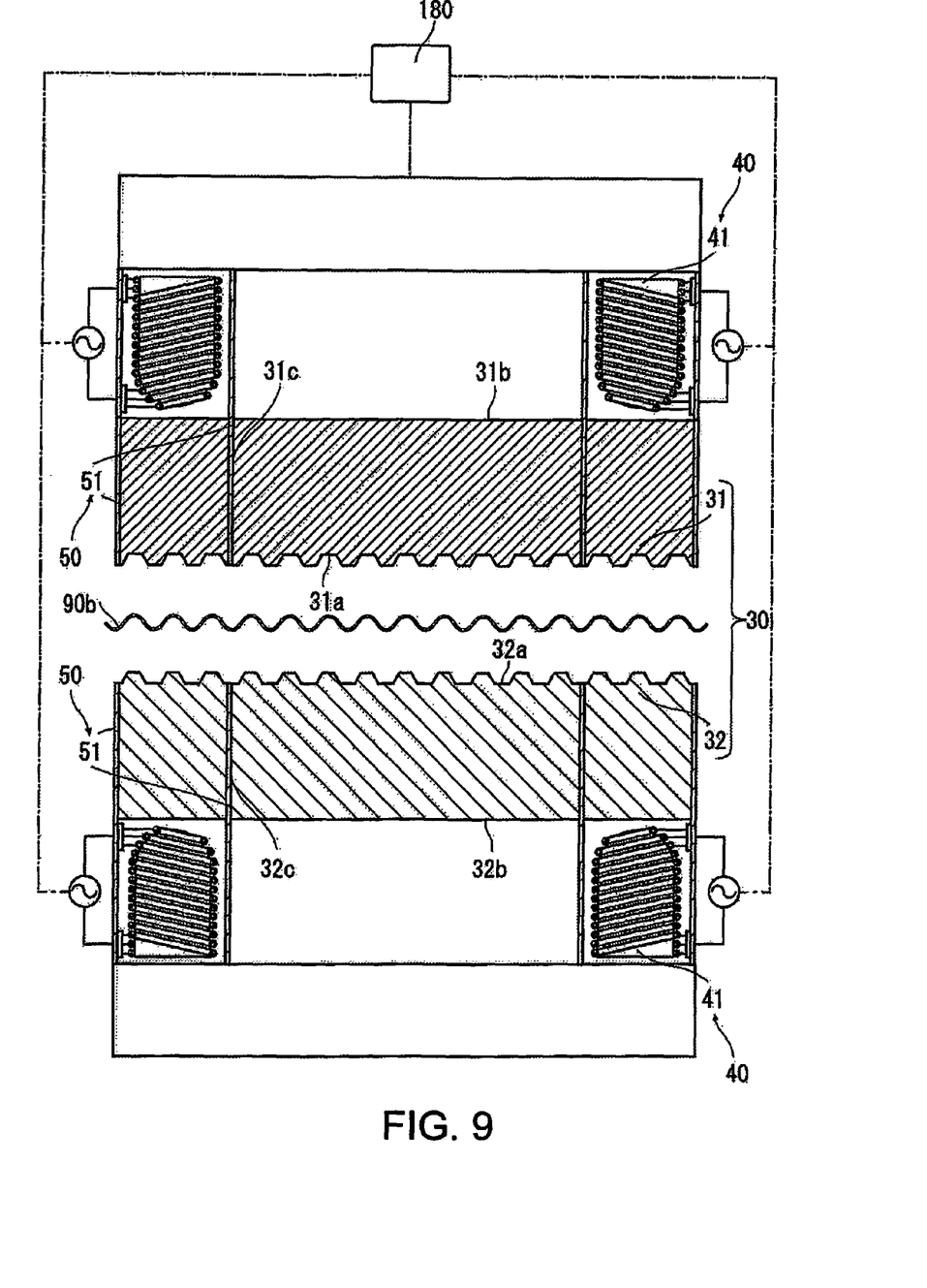
FIG. 9 is an end surface view showing the state in which the thin plate-shaped base material is conveyed in to the channel processing part of the molding device according to the embodiment after preparatory molding.
Figure 10:
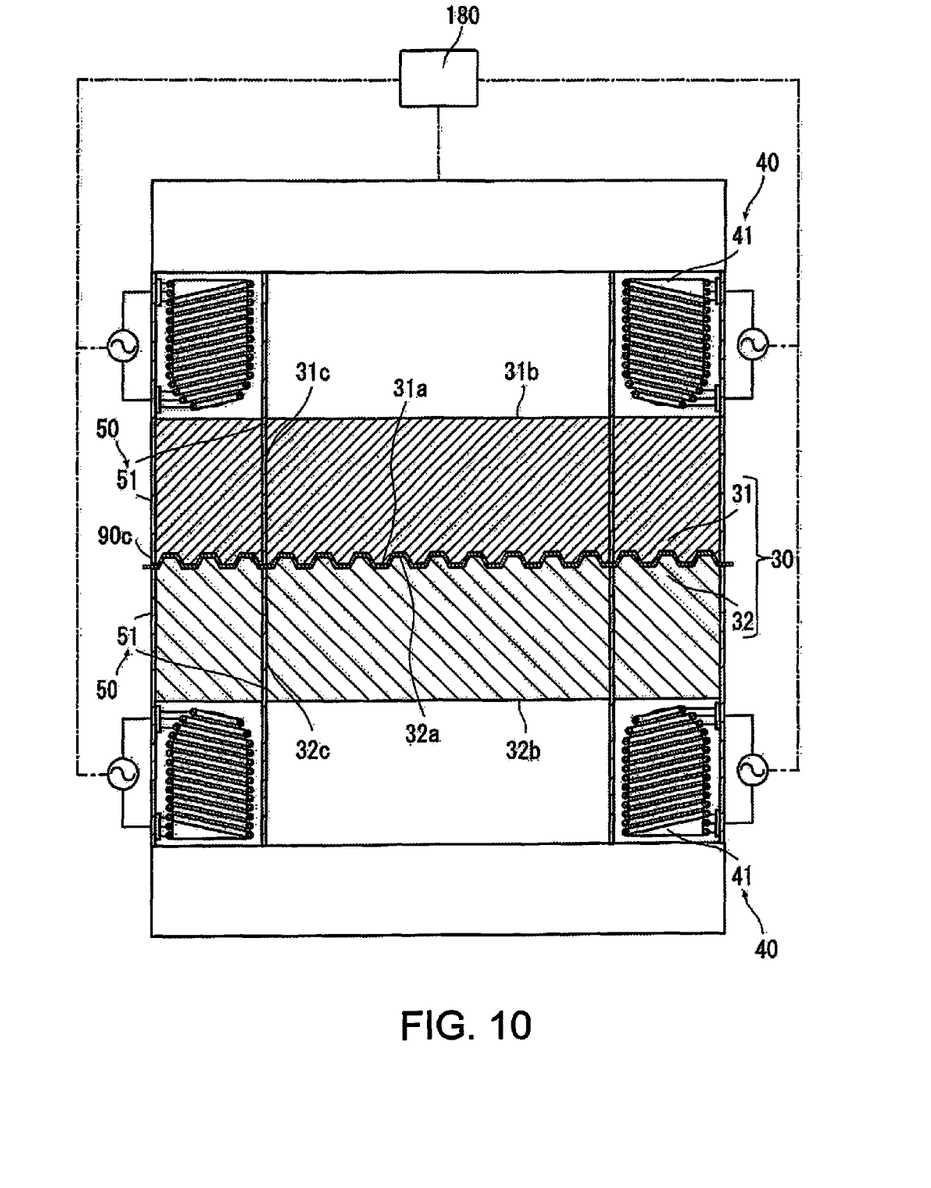
FIG. 10 is an end surface view showing the state in which the channels are formed in the thin plate-shaped base material by the channel processing part, the second heating part, and the insulating parts of the molding device according to the embodiment.
Figure 11:
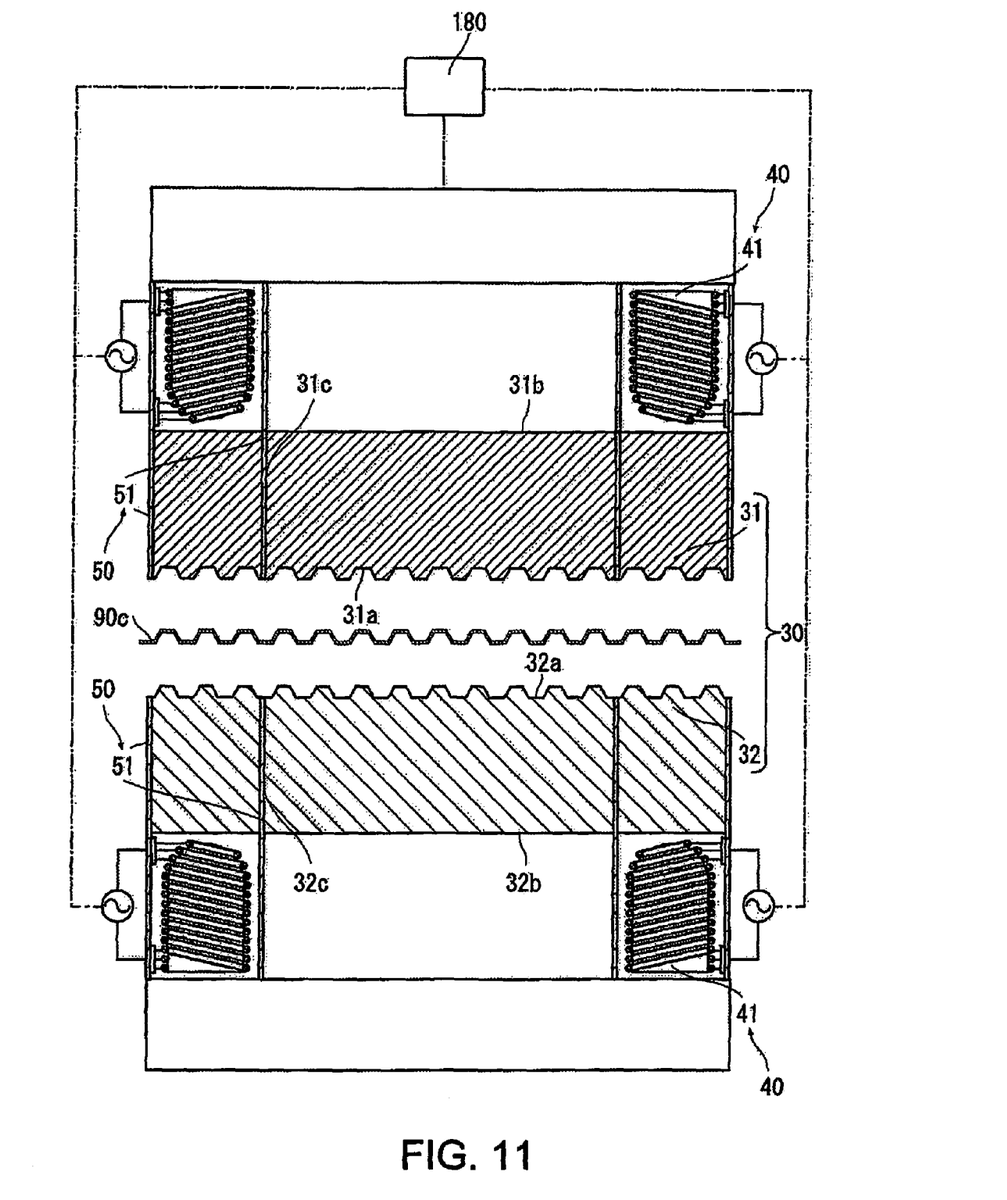
FIG. 11 is an end surface view showing the state in which the thin plate-shaped base material is conveyed out from the channel processing part of the molding device according to the embodiment after the channels are finished being molded.

FIG. 7 is a flowchart showing the operations of the molding device 100. FIG. 8 is an end surface view showing the state in which the thin plate-shaped base material 90 is conveyed out from the preparatory processing part 20 of the molding device 100 after the preparatory molded article 90b has finished being molded. FIG. 9 is an end surface view showing the state in which the thin plate-shaped base material 90 is conveyed in to the channel processing part 30 of the molding device 100 after preparatory molding. FIG. 10 is an end surface view showing the state in which the channels 90c are formed in the thin plate-shaped base material 90 by the channel processing part 30, the second heating part 40, and the insulating parts 50 of the molding device 100. FIG. 11 is an end surface view showing the state in which the thin plate-shaped base material 90 is conveyed out from the channel processing part 30 of the molding device 100 after the channels 90c are finished being molded.

When the molding device 100 begins molding ("START"), the first heating members 11 of the first heating part 10 are controlled by the controller 180 to begin heating, as shown in FIGS. 1 and 2. The first heating part 10 heats the area (the first area a1) where the channels 90c are formed in the thin plate-shaped base material 90 conveyed by the molding device 100 (step S1). The first area a1 of the thin plate-shaped base material 90 is sufficiently softened by being heated by the first heating part 10. When the molding device 100 conveys the thin plate-shaped base material 90 by a predetermined pitch, the portioned softened by being heated by the first heating part 10 reaches the preparatory processing part 20.

The preparatory processing part 20 presses the thin plate-shaped base material 90 using the preparatory processing upper die 21 and the preparatory processing lower die 22, forming the preparatory molded article 90b (step S2). When the molding device 100 conveys the thin plate-shaped base material 90 by a predetermined pitch, the portion of the preparatory molded article 90b formed by the preparatory molding of the preparatory processing part 20 reaches the channel processing part 30.

While the channel-processing upper die 31 is separated from the channel-processing lower die 32 as shown in FIG. 9, the channel processing part 30 conveys the thin plate-shaped base material in between the two dies (step S3).

The channel processing part 30 places the thin plate-shaped base material 90 on the channel-processing lower die 32 so that the irregular shape of the conveyed in preparatory molded article 90b corresponds to the irregular shape of the channel-processing lower die 32. Next, the channel-processing part 30 is controlled by the controller 180 to lower the channel-processing upper die 31 toward the channel-processing lower die 32 and the thin plate-shaped base material 90 in which the preparatory molded article 90b is formed. The channel-processing upper die 31 pushes out the preparatory molded article 90b formed in the thin plate-shaped base material 90 to face downward in the drawing.

When the channel-processing upper die 31 is finished lowering, the pressing surface 31a of the channel-processing upper die 31 and the pressing surface 32a of the channel-processing lower die 32 begin pressing the preparatory molded article 90b formed in the thin plate-shaped base material 90, as shown in FIG. 10. Because the preparatory molded article 90b formed in the thin plate-shaped base material 90 is softened, when the preparatory molded article 90b is pressed to form the channels 90c, wrinkles and other distortions are gradually pushed out particularly to the four corners of the outer periphery of the first area a1 where the channels 90c are formed.

Next, when a predetermined time elapses after the channel-processing upper die 31 and the channel-processing lower die 32 press the thin plate-shaped base material 90 to begin forming the channels 90c, the second heating part 40 is controlled by the controller 180 to supply electric power to the respective second heating members 41. The respective second heating members 41 begin heating due to the supply of electric power, and the four corners of the channel-processing upper die 31 and the channel-processing lower die 32 begin to be heated. At this time, the controller 180 controls the die temperatures so that the die temperature of the channel-processing lower die 32 is lower than the die temperature of the channel-processing upper die 31.

When the respective four corners of the channel-processing upper die 31 and the channel-processing lower die 32 begin to be heated, the four corners (the second areas) of the first area a1 of the thin plate-shaped base material 90 pressed while heated by these dies are further softened. Wrinkles and other distortions pushed out to the four corners (the second areas) of the first area a1 of the thin plate-shaped base material 90 are thereby further pushed out towards the ends of the second areas a2 (step S4).

Next, the channel-processing upper die 31 is controlled by the controller 180 to move away from the channel-processing lower die 32. The separating of the channel-processing upper die 31 from the channel-processing lower die 32 completes the molding of the channels 90c from which wrinkles and other distortions have been removed (step S5). The supply of electric power to the second heating members 41 is cut off by the control of the controller 180 at the same time that the channel-processing upper die 31 separates from the channel-processing lower die 32, and heating is stopped. When the molding device 100 conveys the thin plate-shaped base material 90 by a predetermined pitch, the thin plate-shaped base material 90 in which the channels 90c have finished being molded is conveyed to a press die for taking the base material off. Hereinafter in the molding device 100, the metal separator 91 is punched out of the thin plate-shaped base material 90 after the manifold holes 90d to 90i have been formed. The outgoing conveyor 140 conveys out the punched out metal separator 91, and the outgoing feeder 150 conveys out the thin plate-shaped base material 90 which is to be destroyed after the metal separator 91 has been punched out.

The following operative effects are exhibits by the molding device 100 for a metal separator according to the embodiment described above.

In the present device 100 for molding the metal separator 91, the thin plate-shaped base material 90 is press-molded by the channel-processing upper die 31 (the first die) and the channel-processing lower die 32 (the second die) which are provided to be capable of moving towards and away from each other. The device 100 for molding the metal separator 91 has a first heating part 10 (the heating part), a channel processing part 30 (the processing part), and a controller 180. The first heating part 10 heats the thin plate-shaped base material 90. The channel processing part 30 presses the heated thin plate-shaped base material 90 using the channel-processing upper die 31 and the channel-processing lower die 32 to form channels 90c through which a medium flows. The controller 180 controls the operations of the first heating part 10 and the channel processing part 30.

With this configuration, the thin plate-shaped base material 90 is heated by the first heating part 10, and the heated thin plate-shaped base material 90 is pressed by the channel-processing upper die 31 and the channel-processing lower die 32 in the channel processing part 30. Because the thin plate-shaped base material 90 is thus pressed by the channel-processing upper die 31 and the channel-processing lower die 32 after having been heated and softened, wrinkles and other distortions created during press molding can be removed in the surface direction and the metal separator can be molded without any residual distortions. As a result of no distortions remaining in the metal separator, sufficient positional accuracy can be obtained, and the metal separator is easily positioned when layered over a membrane electrode assembly. Furthermore, because no distortions remain in the metal separator in the thickness direction of the base material, after the metal separator and a membrane electrode assembly are stacked to assemble a cell module, deformation of the cell module can also be prevented.

There is also a second heating part 40 (the other heating part), provided to the channel processing part 30, for heating parts of the outer periphery (the second areas a2) of the area (the first area a1) in the thin plate-shaped base material 90 where the channels 90c are formed, and the controller 180 preferably heats parts of the outer periphery of the channels 90c by means of the second heating part 40 when the channels 90c are formed by the channel-processing upper die 31 (the first die) and the channel-processing lower die 32 (the second die).

With this configuration, because parts of the outer periphery (the second areas a2) of the first area a1 of the thin plate-shaped base material 90 are heated by the second heating part 40, wrinkles and other distortions can be further pushed out towards the ends of the second areas a2. Thus, the thin plate-shaped base material 90 is heated in two stages by the first heating part 10 and the second heating part 40, whereby wrinkles and other distortions created during press molding can be reliably removed in the surface direction.

The second heating part 40 (the other heating part) preferably heats the four corners (the second areas) of the rectangular-shaped first area a1 (the area).

With this configuration, because the four corners (the second areas a2) in the outer periphery of the first area a1 of the thin plate-shaped base material 90 are heated by the second heating part 40, wrinkles and other distortions can be further pushed out towards the ends of the second areas a2. Thus, the thin plate-shaped base material 90 is heated in two stages by the first heating part 10 and the second heating part 40, whereby wrinkles and other distortions created during press molding can be reliably removed in the surface direction.

The area (the first area a1) of the thin plate-shaped base material 90 where the channels 90c are formed, also preferably has the insulating parts 50, which are provided to the channel processing part 30 (the processing part) and which insulate and separate the areas of parts of the outer periphery (the second areas a2) and the other areas.

With this configuration, heat transfer between the second areas a2 (parts or the four corners of the outer periphery of the channels 90c) of the thin plate-shaped base material 90 and the other areas can be blocked by providing the insulating parts 50. Two-stage heating with a time difference can thereby be performed by the first heating part 10 for heating the first area a1 and the second heating part 40 for heating the second areas a2.

The channel-processing upper die 31 (the first die) and the channel-processing lower die 32 (the second die) preferably have different respective die temperatures when the channels 90c are being formed.

With this configuration, the die temperatures are preferably controlled by the controller 180 so that the die temperature of the channel-processing lower die 32 is lower than the die temperature of the channel-processing upper die 31. This heating control causes the thin plate-shaped base material 90 in which the channels 90c are formed to stick to the channel-processing lower die 32 side due to shrinkage deformation when the channel-processing upper die 31 and the channel-processing lower die 32 are separated. Because the thin plate-shaped base material 90 in which the channels 90c are formed thus sticks to the channel-processing lower die 32 side, the base material can easily be conveyed without creating wrinkles and other distortions to the next processing part for forming the manifold holes 90d to 90i as shown in FIG. 2.

The following operative effects are exhibited by the method for molding a metal separator according to the embodiment described above.

In the present method for molding the metal separator 91, the thin plate-shaped base material 90 is press-molded by the channel-processing upper die 31 (the first die) and the channel-processing lower die 32 (the second die) which are provided to be capable of moving towards and away from each other, and the method has a heating step and a processing step. The heating step heats the thin plate-shaped base material 90. The processing step presses the heated thin plate-shaped base material 90 by means of the channel-processing upper die 31 and the channel-processing lower die 32 to form the channels 90c through which a medium flows.

With this method, the heated thin plate-shaped base material 90 is pressed by the channel-processing upper die 31 (the first die) and the channel-processing lower die 32 (the second die). Because the thin plate-shaped base material 90 is thus pressed by the channel-processing upper die 31 and the channel-processing lower die 32 after having been heated and softened, wrinkles and other distortions created during press molding can be removed in the surface direction and the metal separator can be molded without any residual distortions. As a result of there being no distortions remaining in the metal separator, sufficient positional accuracy can be obtained, and the metal separator is easily positioned when layered over a membrane electrode assembly. Furthermore, because no distortions remain in the metal separator in the thickness direction of the base material, after the metal separator and a membrane electrode assembly are stacked to assemble a cell module, deformation of the cell module can also be prevented.

In the processing step, parts of the outer periphery (the second areas a2) of the area (the first area a1) of the thin plate-shaped base material 90 where the channels 90c are formed are preferably heated.

With this method, because parts of the outer periphery (the second areas a2) of the first area a1 of the thin plate-shaped base material 90 are heated, wrinkles and other distortions can be further pushed out towards the ends of the second areas a2. Thus, the thin plate-shaped base material 90 is heated in two stages, whereby wrinkles and other distortions created during press molding can be reliably removed in the surface direction.

In the processing step, the four corners (the second areas) of the rectangular-shaped first area a1 (the area) are preferably heated.

With this method, because the four corners (the second areas a2) in the outer periphery of the first area a1 of the thin plate-shaped base material 90 are heated in the processing step, wrinkles and other distortions can be further pushed out towards the ends of the second areas a2. Thus, the thin plate-shaped base material 90 is heated in two stages by the first heating part 10 and the second heating part 40, whereby wrinkles and other distortions created during press molding can be reliably removed in the surface direction.

The channel-processing upper die 31 and the channel-processing lower die 32 preferably have different respective die temperatures when the channels 90c are being formed.

With this method, the die temperature of the channel-processing lower die 32 can be made lower than the die temperature of the channel-processing upper die 31. Doing so causes the thin plate-shaped base material 90 in which the channels 90c are formed to stick to the channel-processing lower die 32 side due to shrinkage deformation when the channel-processing upper die 31 and the channel-processing lower die 32 are separated. Because the thin plate-shaped base material 90 in which the channels 90c are formed thus sticks to the channel-processing lower die 32 side, the base material can easily be conveyed without creating wrinkles and other distortions to the next processing part for forming the manifold holes 90d to 90i as shown in FIG. 2.

Additionally, various modifications can be made to the present invention on the basis of the configuration set forth in the patent claims, and such modifications would belong to the category of the present invention.

For example, the present embodiment described a configuration in which the upper die 110 (including the preparatory processing upper die 21 and the channel-processing upper die 31) was a movable die and the lower die 120 (including the preparatory processing lower die 22 and the channel-processing lower die 32) was a stationary die. However, the invention is not limited to this configuration; e.g., the upper die 110 and the lower die 120 can be movable dies configured to be capable of moving towards and away from each other.

The present invention depicted an embodiment in which the die temperature of the channel-processing lower die 32 was made lower than the die temperature of the channel-processing upper die 31, but the opposite is also possible, to make the die temperature of the channel-processing lower die 32 higher than the die temperature of the channel-processing upper die 31. In this case, the thin plate-shaped base material 90 in which the channels 90c are formed can be made to stick to the channel-processing upper die 31 side.

The invention claimed is:

1. A metal separator molding device for molding a metal separator by press-molding a thin plate-shaped base material using a first die and a second die capable of moving towards and away from each other, the metal separator molding device comprising:
a first heating part configured to heat the thin plate-shaped base material;
a processing part configured to press the thin plate-shaped base material heated by the first heating part using the first die and the second die to form channels through which a medium is configured to flow;
a second heating part configured to concentrate heat in four corners of an outer periphery of the thin plate-shaped base material where the channels are formed, the processing part including the second heating part, the outer periphery defining a rectangular shaped area; and
a controller configured to control operations of the first and second heating parts and the processing part, the controller being further configured to control the second heating part to heat the area of the outer periphery with the channels while the channels are being formed by the first die and the second die to substantially eliminate distortions in the surface direction formed during press-molding.

2. The metal separator molding device according to claim 1, further comprising
a plurality of insulating parts arranged to insulate and divide the four corners of the outer periphery and a remaining area of the outer periphery of the thin plate-shaped base material where the channels are formed, the processing part including the insulating parts.

3. The metal separator molding device according to claim 1, wherein
the thin plate-shaped base material is conveyed under tension.

4. The metal separator molding device according to claim 3, wherein
the channels are formed in a direction orthogonal to a conveying direction.

5. A metal separator molding device for molding a metal separator by press-molding a thin plate-shaped base material using a first die and a second die capable of moving towards and away from each other, the metal separator molding device comprising:
a first heating part configured to heat the thin plate-shaped base material;
a preparatory processing part configured to form a preparatory molded article with a preparatory processing first die and a preparatory processing second die from the heated thin plate-shaped base material;
a processing part configured to press the preparatory molded article formed by the preparatory processing part using the first die and the second die to form channels through which a medium is configured to flow, the first and second dies being heated;
a second heating part configured to heat a portion of an outer periphery of the preparatory molded article when the preparatory molded article is being pressed by the first die and the second die of the processing part;
a thermal insulating part configured to insulate and separate the portion of the outer periphery from a remaining portion of the outer periphery of the preparatory molded article such that the second heating part only heats the portion of the outer periphery; and
a controller configured to control operations of the first heating part, the preparatory processing part, the processing part and the second heating part,
the first die and the second die having different die temperatures while the channels are being formed.

6. The metal separator molding device according to claim 5, wherein
the thin plate-shaped base material is conveyed under tension.

7. The metal separator molding device according to claim 6, wherein
the channels are formed in a direction orthogonal to a conveying direction.

8. A method for molding a metal separator in which a thin plate-shaped base material is press-molded by moving a first die and a second die towards and away from each other, the method comprising:
a heating step of heating the thin plate-shaped base material; and
a processing step of pressing the heated thin plate-shaped base material using the first die and the second die to form channels through which a medium is configured to flow;
in the processing step, heating is concentrated in four corners of an outer periphery of the thin plate-shaped base material where the channels are formed to substantially eliminate distortions in the surface direction formed during press-molding, the outer periphery defining a rectangular-shaped area.

9. The method according to claim 8, further comprising conveying the thin plate-shaped base material under tension.

10. The method according to claim 9, further comprising forming the channels in a direction orthogonal to a conveying direction.

11. A method for molding a metal separator in which a thin plate-shaped base material is press-molded by moving a first die and a second die towards and away from each other, the method for molding the metal separator comprising
a first heating step of heating the thin plate-shaped base material;
a preparatory processing step of forming a preparatory molded article with a preparatory processing first die and a preparatory processing second die from the heated thin plate-shaped base material;
a processing step of pressing the preparatory molded article using the first die and the second die to form channels through which a medium is configured to flow; and
a second heating step of heating the first die and the second die in an insulated state to concentrate heat in a portion of an outer periphery of the preparatory molded article when the preparatory molded article is being pressed by the first die and the second die of the processing part, the first die and the second die being provided with different die temperatures during press molding.

12. The method according to claim 11, further comprising conveying the thin plate-shaped base material under tension.

13. The method according to claim 12, further comprising forming the channels in a direction orthogonal to a conveying direction.

\* \* \* \* \*